United States Patent
Chu et al.

(10) Patent No.: US 11,735,163 B2
(45) Date of Patent: Aug. 22, 2023

(54) HUMAN-MACHINE DIALOGUE METHOD AND ELECTRONIC DEVICE

(71) Applicant: AI SPEECH CO., LTD, Jiangsu (CN)

(72) Inventors: Min Chu, Suzhou (CN); Taotao Guo, Suzhou (CN); Zhongyuan Dai, Suzhou (CN); Chao Yang, Suzhou (CN)

(73) Assignee: AI SPEECH CO., LTD., Jiangsu (CN)

( * ) Notice: Subject to any disclaimer, the term of this patent is extended or adjusted under 35 U.S.C. 154(b) by 224 days.

(21) Appl. No.: 16/769,272

(22) PCT Filed: Jan. 22, 2019

(86) PCT No.: PCT/CN2019/072603
§ 371 (c)(1),
(2) Date: Jun. 3, 2020

(87) PCT Pub. No.: WO2019/144858
PCT Pub. Date: Aug. 1, 2019

(65) Prior Publication Data
US 2020/0395000 A1  Dec. 17, 2020

(30) Foreign Application Priority Data
Jan. 23, 2018 (CN) .......................... 201810062270.3

(51) Int. Cl.
*G10L 15/22* (2006.01)
*G06F 16/332* (2019.01)
(Continued)

(52) U.S. Cl.
CPC ............ *G10L 15/02* (2013.01); *G06F 16/337* (2019.01); *G06F 16/3329* (2019.01); *G06N 5/04* (2013.01); *G06N 7/01* (2023.01); *G10L 15/22* (2013.01)

(58) Field of Classification Search
CPC ..... G10L 15/22; G06F 16/337; G06F 16/3329
See application file for complete search history.

(56) References Cited

U.S. PATENT DOCUMENTS 6,415,257 B1 * 7/2002 Junqua ............. H04N 21/42203
704/275
10,044,862 B1 * 8/2018 Cai ........................ G06N 20/00
(Continued)

FOREIGN PATENT DOCUMENTS

CN 101071418 A 11/2007
CN 105068661 A 11/2015
(Continued)

OTHER PUBLICATIONS

Hiraoka, T., Yamauchi, Y., Neubig, G., Sakti, S., Toda, T., & Nakamura, S. (Dec. 2013). Dialogue management for leading the conversation in persuasive dialogue systems. In 2013 IEEE Workshop on Automatic Speech Recognition and Understanding (pp. 114-119). IEEE.*
(Continued)

*Primary Examiner* — Bryan S Blankenagel
(74) *Attorney, Agent, or Firm* — Harness, Dickey & Pierce, P.L.C.; Stephen T. Olson

(57) ABSTRACT

Disclosed is a human-computer dialogue method including determining a set number of jump topics about a target topic, and generating a topic jump map converging to the target topic based on the correlation intensions among the set number of jump topics; after an initial response to a user's dialogue request, selecting from the topic jump map a jump topic to which the user's dialogue request relates as an initial topic for a first round of recommendation; after completing a human-machine dialogue of the initial topic, determining a jump topic to jump according to the jump probability of jumping out of the initial topic to the k jump topics at the downstream level for a next round of recommendation; and gradually guiding from the initial topic to the target topic by step-by-step recommendation. A more fluent and efficient (Continued)

human-machine dialogue based on a clear communication goal can be realized.

12 Claims, 3 Drawing Sheets

(51) Int. Cl.
*G06F 16/335* (2019.01)
*G10L 15/02* (2006.01)
*G06N 5/04* (2023.01)
*G06N 7/01* (2023.01)

(56) References Cited

U.S. PATENT DOCUMENTS

| | | | |
|---|---|---|---|
| 2010/0082640 | A1 | 4/2010 | Wexler et al. |
| 2012/0253801 | A1* | 10/2012 | Santos-Lang ........... G10L 15/22 704/235 |
| 2015/0112918 | A1* | 4/2015 | Zheng ................... G06Q 30/02 706/48 |
| 2015/0370787 | A1 | 12/2015 | Akbacak et al. |
| 2017/0060839 | A1* | 3/2017 | Kawamura ............. G10L 25/63 |
| 2017/0186425 | A1* | 6/2017 | Dawes ................ G10L 15/1815 |
| 2017/0324867 | A1* | 11/2017 | Tamblyn ............. H04L 65/1093 |
| 2018/0122377 | A1* | 5/2018 | Skantze ............. G10L 15/1822 |
| 2018/0129752 | A1* | 5/2018 | Blomberg ............. G06F 16/334 |
| 2018/0341684 | A1* | 11/2018 | Dechu ................... G06F 16/243 |
| 2018/0357302 | A1 | 12/2018 | Qi et al. |
| 2019/0278864 | A2 | 9/2019 | Qi et al. |

FOREIGN PATENT DOCUMENTS

| | | |
|---|---|---|
| CN | 105183848 A | 12/2015 |
| CN | 106575503 A | 4/2017 |
| CN | 106874292 A | 6/2017 |
| CN | 108415932 A | 8/2018 |
| WO | WO2017041372 A1 | 3/2017 |

OTHER PUBLICATIONS

Song, Y., Zhou, D., & He, L. W. (Feb. 2012). Query suggestion by constructing term-transition graphs. In Proceedings of the fifth ACM international conference on Web search and data mining (pp. 353-362).*
European Search Report in corresponding European Application No. 19743677.7, dated Aug. 20, 2021. 8 pages.
International Search Report (in English and Chinese) and Written Opinion of the ISA (in Chinese) issued in PCT/CN2019/072603, dated Apr. 26, 2019; ISA/CN.
European Communication pursuant to Article 94(3) EPC for European Application No. 19 743 677.7 dated Nov. 15, 2022.
Japanese Notice of Reasons for Refusal for Japanese Application No. 2020-537003 dated Oct. 27, 2022.
Yamauchi Yuki Extension of Subject Derivation Response Sentence Generation Using Relationship between Terms [in / Outside / Four Persons and Dialogue System ], Evaluation, and Acoustical Society of Japan 2013 Toshiharu ****** Lecture Collected-Papers CD-ROM [CD-ROM], General Incorporated Foundation Acoustical Society of Japan, Mar. 5, 2013, pp. 87-88.

* cited by examiner

HUMAN-MACHINE DIALOGUE METHOD AND ELECTRONIC DEVICE

CROSS-REFERENCE TO RELATED APPLICATIONS

This application is a 371 U.S. National Phase of International Application No. PCT/CN2019/072603, filed Jan. 22, 2019, which claims the benefit of Chinese Patent Application No. 201810062270.3, filed Jan. 23, 2018. The disclosures of the above applications are incorporated herein by reference.

TECHNICAL FIELD

The present disclosure relates to the technical field of artificial intelligence, and in particular to a human-machine dialogue method and an electronic device.

BACKGROUND

At present, various dialogue robots have emerged on the market, some appear in the form of personal assistant (siri, cortana, Lingxi, etc.), some appear as chat robots (Xiao Bing, Du Mi), and others are built in terminals such as smart speakers, smart car devices and smart TVs. The dialogue technologies behind these robots can be roughly divided into four types.

Task-based dialogue: a vertical dialogue customized to tasks that users often need, such as ordering meals, booking tickets, looking for music, movies or a certain commodity, etc. After a user speaks a sentence, it is first determined which task is required, and then parameters of the user's demand is extracted from the sentence (such as place of departure, restaurant type, etc.). If the necessary parameters defined in advance are not collected, the robot will obtain information by asking questions. Therefore, the task-based dialogue usually involves multiple rounds. The user may also constantly modify or perfect his/her needs during the dialogue.

Dialogue based on question-and-answer pairs: knowledge is organized in the form of question-and-answer pairs. User's questions are compared with the questions in the question-and-answer pairs to find and return the closest answer. This kind of dialogue is commonly used in customer service robots and chatbots. Many such question-and-answer services are single round, and some have multi-round dialogue capabilities, mainly involving simple context processing and referential disambiguation.

Dialogue based on knowledge map: a user uses natural language/voice to query factual knowledge stored in the form of triples. For example, "How tall is Yao Ming's daughter?" When conducting such dialogues, it is necessary for the robot to have a certain reasoning ability. Two steps are carried out for the above sentence: (1) Yao Ming's daughter->Yao Qinlei; and (2) Yao Qinlei's height->160 cm. Most of these dialogues are single-round, and some have certain multi-round dialogue capabilities, mainly involving referential disambiguation (how old is she? in which she->Yao Qinlei).

Generative chat: by training a neural network model, a response can be automatically generated to a user question. There is no clear communication goal and field limitation for this type of chat. When the user speaks a sentence, the system automatically generates a reply. The reply is related to the question, but there is no clear communication goal. This type of dialogue is also called an open domain chat.

Open domain chat in the existing human-machine dialogue system mainly serves to shorten distance, establish trust relationships, providing emotional companionship, smoothing dialogue process (for example, when a task dialogue cannot meet the user's needs) and improve holding of users.

Various intelligent robots in the prior art adopt one of these forms or a combination of several forms. Among all these dialogue forms, basically human are active and machines are passive, namely the machine waits for people to ask questions and then gives answers. In a task-based dialogue, the machine may also ask human questions, but under very clearly defined circumstances. For example, the task of buying a ticket defines three required parameters in advance: point of departure, place of arrival, and departure time. Only if the user gives all the above information, can the robot issue an inquiry to the ticket service system, otherwise the robot will ask questions to obtain the missing information. In an overall sense, the machine is still in passively waiting status.

In summary, at present, various question-and-answer robots are passive. The robot is waiting for a user to ask questions. After the user actively asks the question, the robot starts to understand the user's intention and retrieves and feeds back answers or performs actions according to the user's intention. Although there may be many rounds of dialogue, it is mainly to ask the user some necessary parameters (which day to go? What color do you like?). The robot itself has no clear intention to talk. In such a dialogue system, if the user cannot remember the topic or the specific way of asking questions, the dialogue will not be able to continue. So the robot cannot do as what the user wishes to provide the user with a better interactive experience.

SUMMARY

Embodiments of the present disclosure provide a human-machine dialogue method and an electronic device, which direct to at least one of the above technical problems.

In one aspect, an embodiment of the present disclosure provides a human-machine dialogue method applicable to an electronic device, which includes:

determining a set number of jump topics around a target topic, and generating a topic jump map converging to the target topic based on correlation intensions among the set number of jump topics, wherein k path segments from each jump topic to k available jump topics at a downstream level are configured respectively with an initial jump probability;

after an initial response to a user's dialogue request, selecting from the topic jump map a jump topic to which the user's dialogue request belongs as an initial topic so as to conduct a first round of recommendation to the user;

after completing a human-machine dialogue of the initial topic, determining a jump topic for jumping to according to the jump probability of jumping out of the initial topic to the k jump topics at the downstream level so as to conduct a next round of recommendation to the user; and gradually guiding the dialogue from the initial topic to the target topic in a step-by-step recommendation manner.

In a second aspect, an embodiment of the present invention provides another human-machine dialogue method applicable to an electronic device, which includes:

determining a set number of jump topics around a target topic, and generating a topic jump map converging to the target topic based on the correlation intensions among the set number of jump topics, wherein k path segments from each jump topic to k available jump topics at a downstream level are configured with an initial jump probability;

after an initial response to a user's dialogue request, selecting from the topic jump map a jump topic to which the user's dialogue request belongs as an initial topic for a first round of recommendation to the user;

after completing a human-machine dialogue of the initial topic, determining a jump topic for jumping to according to the jump probability of jumping out of the initial topic to the k available jump topics at the downstream level for next round of recommendation to the user; and continuously recommending jump topics in the topic jump map in a step-by-step recommendation manner.

In a third aspect, an embodiment of the present invention provides a non-volatile computer-readable storage medium, in which one or more programs including execution instructions are stored, and the execution instructions can be read and executed by an electronic device (including but not limited to computers, servers, or network devices, etc.) to perform any of the above human-machine dialogue methods of the present invention.

According to a fourth aspect, an electronic device is provided which includes: at least one processor, and a memory communicatively connected to the at least one processor, wherein the memory stores instructions executable by the at least one processor to perform any of the human-machine dialogue methods of the present invention.

According to a fifth aspect, an embodiment of the present invention further provides a computer program product including a computer program stored in a non-volatile computer-readable storage medium, and the computer program includes program instructions which, when being executed by a computer, enable the computer to perform any of the above-mentioned human-machine dialogue methods.

The beneficial effect of the embodiment of the present invention is that, by establishing in advance a topic jump map based on the correlation intensions among the jump topics, determining the first dialogue request of a user in dialogue as the jump topic in the corresponding topic jump map in the human-machine dialogue process, and then, according to the correlation intenstions among the jump topics, initiatively recommending to the user the next jump topic related to the topic currently being discussed by the user, it is possible for a computer to always be in an efficient operation state whether it is to answer questions raised by the user voluntarily or to recommend related topics to the user based on the user's questions, which improves the utilization of the computer during the human-machine dialogue; and in addition, the smooth progress of the dialogue between human and machine is ensured, which improves the user experience in the human-machine dialogue.

BRIEF DESCRIPTION OF THE DRAWINGS

In order to more clearly explain the technical solutions of the embodiments of the present invention, drawings necessary in the description of the embodiments will be described below. Obviously, the drawings in the following description are some embodiments of the present invention. Those skilled in the art can obtain other drawings based on these drawings without inventive effort.

DETAILED DESCRIPTION

Figure 1:
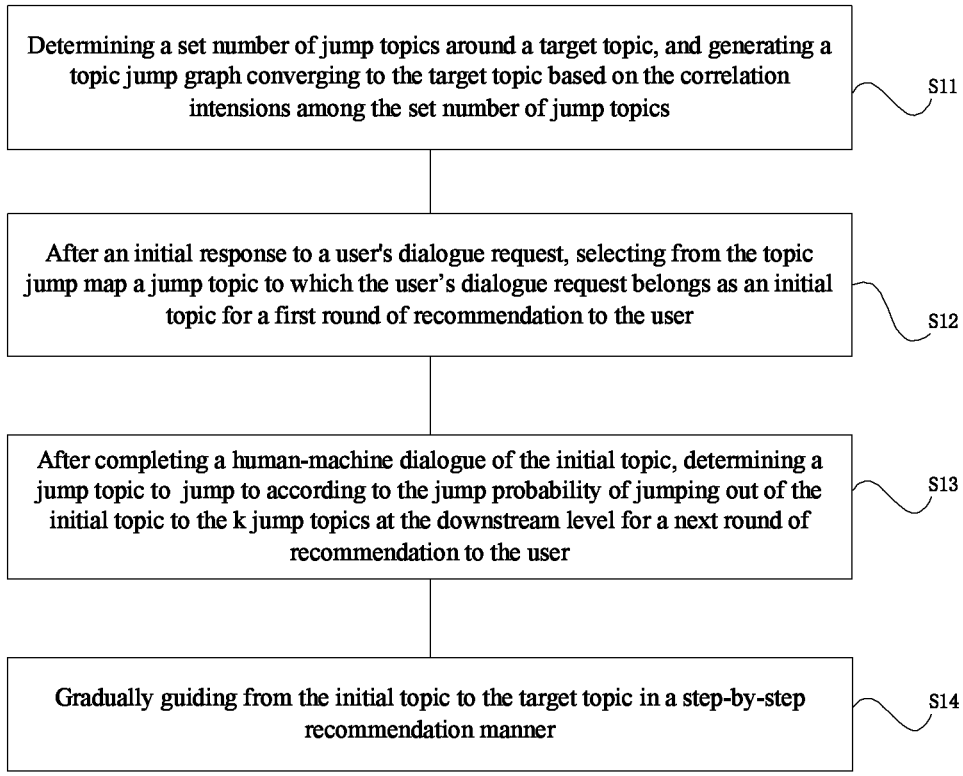
FIG. 1 is a flowchart of an embodiment of a human-machine dialogue method according to the present invention.

To make the objects, technical solutions, and advantages of the embodiments of the present invention clearer, the technical solutions in the embodiments of the present invention will be described clearly and completely in conjunction with the drawings in the embodiments of the present invention. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other without conflict.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

As shown in FIG. 1, an embodiment of the present invention provides a topic jump map optimization method for robot dialogue including the following steps.

In step S11, a set number of jump topics around a target topic is determined, and a topic jump map converging to the target topic is generated based on the correlation intensions among the set number of jump topics, wherein k path segments from each jump topic to k possible jump topics at a downstream level are configured with an initial value of jump probability. K values initial jump probabilities can be expressed as $P_1$-$P_k$.

The target topic in the embodiment of the present invention may be at least one predetermined topic. A series of (for example, 50-100) topics related to the target topic may be used to generate the topic jump map. The set number of jump topics may be classified, for example, into: key topics (some of which may be very important to achieve the goal and should let users get to know as far as possible), related topics (some supplements to the key topics, which helps to achieve communication goals) and interesting topics (topics that increase the delights of communication). Each jump topic and/or target topic respectively includes multiple knowledge points. The knowledge points are expressed by question-and-answer pairs and/or by knowledge maps.

The correlation intension between each two of the jump topics is determined according to various strategies such as the analogy relationship and the reference relationship of the jump topics (after obtaining a series of topics, the topic jump map is constructed according to the correlation intensions between each two of the topics. For example, a jump relationship is established between two topics which have a father and son, inclusion, juxtaposition, citation, or analogy relationship in concept. The jump relationship can also be set according to the semantic similarity of two sets of knowledge points contained in the topic, or be established based on the correlation intension of related topics in literature, books, and network information, which is not limited in the present invention). A topic path for next jump is established for each jump topic. An initial value of probability is assigned to each jump path (the initial probability of each path may be the same or different, for example, different types of relationships correspond to different initial probabilities, or may be calculated according to indexes such as the extent of semantic similarity or the correlation intension between each two of the topics). If special needs arise from experts, they can also specify jump paths and probabilities. After topic planning, a finite state machine among topics is obtained, in which each topic represents a state, and each topic jump is a directed edge with probability. In order to ensure a certain diversity in the dialogue process and at the same time to effectively reach the dialogue goal, usually jump targets for a topic are set at about 10% of the total number of topics (in practice, it is appropriately adjusted according to the total amount of topics).

It should be noted that the downstream level in the embodiment of the present invention is described only with respect to the current jump topic, and there is no such relationship as upstream and downstream levels in the entire topic jump map. For example, for the current topic A1, if the topics which can jump to from topic A1 include topics B, C, and D, then topics B, C, and D are the jump topics at the downstream level of topic A1. If topic A and topic A2 also exist and topics A1 and A2 are at the downstream level of topic A, jumps from topic A2 to topics B, C, and D are not available (that is, there is no jump path to these topics). Therefore, even if topics A1 and A2 belong to the downstream level of topic A and topics B, C, and D are at the downstream level of topic A1, since jumps from topic A2 to topics B, C, and D are not available, there is no relationship of upstream and downstream levels.

In step S12, after an initial response to a user's dialogue request, a jump topic to which the user's dialogue request belongs is selected from the topic jump map as an initial topic, so as to start a first round of recommendation to the user For example, when a user asks "What products does your company have?", this question is interpreted in natural language, and a reply "XXX company focuses on intelligent dialogue interaction in the vertical field. The main products include smart car solutions, smart home solutions, and smart robotics and other Internet of Things and Pan-Internet of Things fields." is presented as a response. Then, a topic containing the user's question is determined as the initial topic. The topic may specifically be the one containing a sentence the same as or similar to that in the user's question contained in the dialogue pair, or the one with its knowledge map containing a knowledge point related to the user's question.

In step S13, after completing a human-machine dialogue about the initial topic, a jump topic from the current topic to is determined according to the jump probabilities of jumping from the initial topic to respective k jump topics at the downstream level, so as to conduct a next round of recommendation to the user.

Specifically, based on the topic jump map, downstream jump topics which can jump to from the initial topic are determined, a target jump topic is selected from the downstream jump topics according to the jump probability, and a question is selected from the knowledge points included in the determined target jump topic to be recommended to the user for human-machine dialogue. After completing the dialogue of the current target jump topic, a downstream jump node to which a jump from the current target jump topic can occur is further determined . . . and so on, until the entire jump path from the initial jump topic to the target topic is determined.

Selecting a target jump topic from the downstream jump topics according to the jump probability may be carried out through sampling by probability. For example, assuming topic A has three jump paths to topics B, C, and D respectively, with corresponding jump probabilities thereof being 0.5, 0.3, and 0.2, then sampling by probability means that if there are 100 human-machine dialogue interactions, 50 take a first route (A-B), 30 take a second route (A-C), and 20 take a third route (A-D).

In step S14, the dialogue is gradually guided from the initial topic to the target topic in a step-by-step recommendation manner.

The topic jump map in the robot dialogue method according to the embodiment of the present invention is obtained through scheduling multiple jump topics around the target topic, and the jump map finally jumps and converges to the target topic, thereby making the robot dialogue of the embodiment of the present invention be able to have a certain dialogue intention (target topic), and the final topic can gradually jump to the target topic of the dialogue intent through the peripheral jump topic that jumps to and converges toward the target topic, thereby helping the dialogue between the user and the robot go smoothly without off-topic (deviating from the topic, that is, deviating from the target topic). In addition, due to the step-by-step recommendation of the downstream jump topic, the robot may have a certain degree of initiative in the dialogue process. On one hand, it can promote a smooth progress of the dialogue and eventually jump to the target topic to complete the dialogue purpose. On the other hand, in the recommendation process, because it is a step-by-step recommendation instead of directly bluntly entering the target topic, it is not liable to arouse user's disgust and hence improve the user experience.

The human-machine dialogue method according to the embodiment of the present invention may be implemented in various product forms, for example, "sales assistant", "enterprise business card", and so on. Among them, for sales assistants, the achievement of sales goals is the purpose, so topics such as "inquiry", "order", and "after-sales" may be determined as target topics, and surrounding topics around specific products to be sold are determined as jump topics to generate a topic jump map that converges to the target topic based on the correlation intension between each two of the jump topics for human-machine dialogue for sales purposes. "Enterprise business card" can be positioned to spread key information of the enterprise or to achieve cooperation as the target function. At this time, it is similar to "sales assistant" in determining the target topic and related jump topics to build a topic jump map for human-machine dialogue. Therefore, the human-machine dialogue method according to the present invention can promote the enterprise's publicity and product sales in the process of providing users with a friendly interactive experience.

Exemplarily, the sales assistant, enterprise business card, etc. may be represented as an application program or WeChat applet, etc., which is not limited in the present invention. The following is a detailed description of the sales assistant as an application.

Different companies can customize their sales assistants for their products.

Exemplarily, the topic related to sales (for example, inquiry, order, after-sales, etc.) is determined as the target topic, and the topic to which other related information of the company belongs (for example, company profile, cases, technical principles, etc.) is used as a jump topic to construct a topic jump map.

In practical application, a user can click to open a sales assistant application, and multiple navigation tags (for example, company profile, cases, technical principles, purchase, etc.) are displayed on a display interface of the application. The user can use voice input to select the navigation tag he/she is interested in, and start a human-machine dialogue from the topic corresponding to the navigation tag selected by the user. The topic is gradually led to the target topic based on the constructed topic jump map.

Exemplarily, a jump relationship converging from the jump topic to the target topic may be: company profile-→cases→technical principles→purchase. An example of a human-machine dialogue is given below:

User: Company Profile

Sales Assistant: XXX was founded in year X, focusing on intelligent dialogue interaction in the vertical field. The main products include smart car solutions, smart home solutions, smart robots and other Internet of Things and pan-Internet of things fields.

Sales Assistant: Do you want to know about the company's related cases?

User: Yes.

Sales Assistant: Our company's voice assistant products have been used in XX smart speakers, and microphone array products have been used in car speakers of XX cars.

User: What other application cases does the microphone array have?

Sales Assistant: The company's dual-microphone array is also applied in . . .

Sales Assistant: Do you want to know about the principle of the dual-microphone array?

User: Yes.

Sales Assistant: The principle of the dual-microphone array is . . .

Sales Assistant: Do you consider using our company's dual-microphone array products?

User: . . .

As can be seen from the above example, the entire human-computer dialogue process starts from the topic selected by the user, and the topic is led to the target topic (sales topic) by gradually answering the user and asking the user based on the recommendation of the topic jump map.

Figure 2:
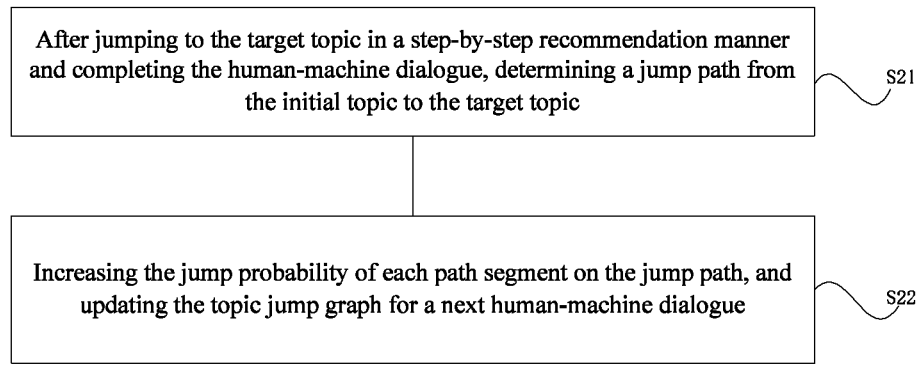
FIG. 2 is a flowchart of another embodiment of the human-machine dialogue method according to the present invention.

As shown in FIG. 2, in some embodiments, the human-machine dialogue method further includes the following steps.

In step S21, after jumping to the target topic in a step-by-step recommendation manner and completing the human-machine dialogue, a jump path from the initial topic to the target topic is determined.

The completion of the human-machine dialogue in the embodiment of the present invention refers to that the user is satisfied with the current human-machine dialogue, which can be determined by selecting the evaluation or answering the question that the robot actively asks whether the dialogue is satisfactory before ending the human-machine dialogue. If the user expresses satisfaction with this human-machine dialogue, it is determined that this human-machine dialogue is completed, and the subsequent steps are performed.

In step S22, the jump probability of each path segment on the jump path is increased, and the topic jump map is updated for a next human-machine dialogue.

Since it has been determined in step S21 that the human-machine dialogue has been completed satisfactorily, this indicates that the jump topics by which the path recommended to the user and guided to the target topic passes in the course of the human-machine dialogue are all jump subjects that the user is more willing to talk about. In order to be able to recommend jump topics recognized by the user with higher probability in the next human-machine dialogue, in the embodiment of the present invention, these jump topics that point to the target topic and are recognized by the user are assigned a greater jump probability.

In the implementation of the present invention, while conducting a human-machine dialogue, the continuous optimization of the topic jump map is also realized, so that the next human-machine dialogue can have better performance, the response speed is faster and more accurate, and the user experience is improved.

In addition, after the adjustment of the jump probability, the calculation amount of the computer can be reduced when the human-machine dialogue is conducted again in the subsequent period. For example, in the case that the computer originally needs to calculate probabilities of 10 steps jumping to reach the target topic, the computer can be optimized to only calculate probabilities of 5 steps jumping to reach the target topic, which reduces the calculation amount of the computer and improves the efficiency of reaching the target topic.

In some embodiments, the sum of the initial jump probabilities of the k path segments from each jump topic to the k jump topics at the downstream level is 1.

While increasing the jump probability of the path segment P (i, i+1) from the i-th jump topic on the jump path to the (i+1)-th jump topic at the downstream level, the jump probabilities of k−1 path segments of k−1 jump topics at the downstream level other than the (i+1)-th jump topic from the i-th jump topic are accordingly decreased to maintain that the sum of the jump probabilities of the k path segments at the downstream level from the i-th jump topic is still 1. The first jump probability can be represented by $P_{f1}$, and the n−1 second jump probabilities can be represented by $P'_{f1}$-$P_{f(n-1)}$.

In this embodiment, the sum of the jump probabilities of path segments from the same jump topic to the k jump topics at the downstream level follows the normalization principle, which can maintain the stability of the entire topic jump map, and facilitate optimized management of the topic jump map for better human-machine dialogue.

Figure 3:
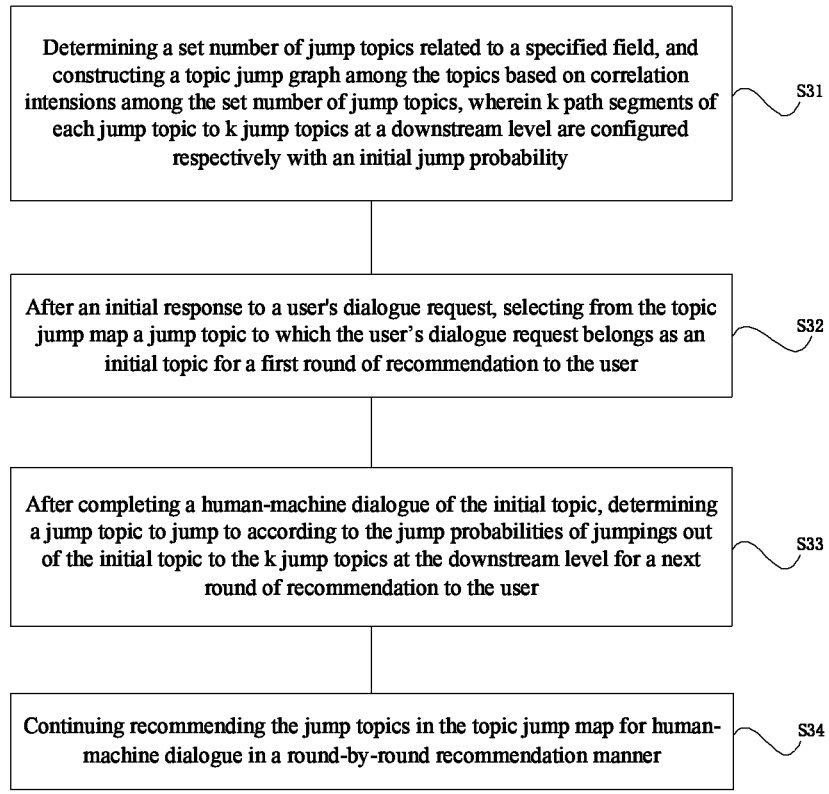
FIG. 3 is a flowchart of yet another embodiment of the human-machine dialogue method according to the present invention.

As shown in FIG. 3, an embodiment of the present invention also provides another human-machine dialogue method including the following steps.

In step S31, a set number of jump topics related to a specified field is determined, and a topic jump map among the topics is constructed based on the correlation intension between each two of the set number of jump topics, wherein k path segments from each jump topic to k jump topics at a downstream level are configured with an initial jump probability. The specified field in the embodiment of the present invention may be fields such as teaching, training, and marketing.

In step S32, after an initial response to a user's dialogue request, a jump topic to which the user's dialogue request belongs is selected from the topic jump map as an initial topic, for a first round of recommendation to the user.

In step S33, after completing a human-machine dialogue of the initial topic, a next jump topic for jumping to is determined according to the jump probability of jumping out of the initial topic to the k jump topics at the downstream level for a next round of recommendation to the user.

In step S34, the human-machine dialogue is carried out by gradually guiding the jump from the initial topic to the target topic in a step-by-step recommendation manner.

By establishing in advance a topic jump map based on the correlation intensions among the jump topics, determining the first dialogue request of the dialogue person as the jump topic in the corresponding topic jump map in the human-machine dialogue process, and then, according to the correlation intensions among the jump topics, actively recommending to the user the next jump topic related to the topic currently being discussed by the user, thus ensuring a smooth progress of the dialogue between human and machine and improving user experience in the human-machine dialogue. In the robot dialogue method according to the embodiment of the present invention, since another topic (that is, the recommended topic) related to the topic currently discussed by the user can always be recommended during the human-machine dialogue, it can be guaranteed that the topic discussed during the human-machine dialogue is always a topic of interest to the user, so that the user can unconsciously talk to the robot about many topics and acquire multi-dimensional and multi-dimensional knowledge.

The human-machine dialogue method according to the embodiment of the present invention may be implemented in various product forms, for example, "enterprise branding card", "story machine", "knowledge encyclopedia", etc. Taking the "enterprise branding card" as an example, multiple topics related to the enterprise can be determined around multiple dimensions of the enterprise (e.g., enterprise development history, enterprise culture, enterprise structure composition, enterprise advantages, enterprise products, enterprise talents, enterprise cases, etc.) to construct a topic jump map in the embodiments of the present invention, so as to implement a human-machine dialogue mode that can actively recommend topics based on the map, which enables the user to learn about the enterprise as comprehensively as possible during the friendly human-machine dialogue for the purpose of enterprise branding.

Exemplarily, the enterprise branding card may be represented as an application program or WeChat applet, etc., which is not limited in the present invention. The following is a detailed description of an enterprise branding card as an application:

Different companies can customize their enterprise branding card robots according to the company's organizational structure. Illustratively, a topic jump map is constructed with the relevance among topics such as company profile, cases, technical principles, products, and product purchasing.

In practical applications, a user can click to open an enterprise branding card program, and multiple navigation tags (for example, company profile, cases, technical principles, products, product purchasing, etc.) are displayed on a display interface of the application, and the user can use voice input to select a navigation tag of interest, and start a human-machine dialogue from the topic corresponding to the navigation tag selected by the user, and the company information is provided to the user based on the constructed topic jump map.

Exemplarily, the jump relationship among the topics in the topic jump map may be: company profile→products→technical principles→cases→products→technical principles→cases→product purchasing→products . . . . An example of a human-machine dialogue is given below:

User: Company Profile

Enterprise branding card: XXX company was established in year X, focusing on intelligent dialogue interaction in the vertical field. The main products include smart car solutions, smart home solutions, smart robots and other Internet of things and Pan Internet of Things fields.

Enterprise branding card: Do you want to know about the company's related products?

User: Yes.

Enterprise branding cards: The company's products include smart car solutions, smart home solutions, smart robot solutions and voice input boards.

Enterprise branding cards: Do you want to know about the technical principles of the company's related products?

User: Yes, I want to know about smart car mounted solutions.

Enterprise branding card: The technical principle of the intelligent vehicle solution is . . .

Enterprise branding card: Do you want to know more about related cases?

User: Yes

Enterprise branding card: The company's smart car mounted solution has been successfully applied to XX cars.

Enterprise branding card: Do you still want to know about our company's smart home solutions?

User: . . .

In this embodiment, during the human-machine dialogue, through the topic jump map composed of different topics, various enterprise information related to the current enterprise can be provided to the user. Since the jump connection relationship among the topics in the topic jump map is determined according to the relevance between the topics, each time the topic recommended to the user would be a topic that is of interest to the user, so that the computer can always be in an efficient operation state whether it is to answer the questions voluntarily raised by the user or to recommend the related topics to the user based on the user's questions, which improves the utilization of the computer during the human-machine dialogue.

Figure 4:
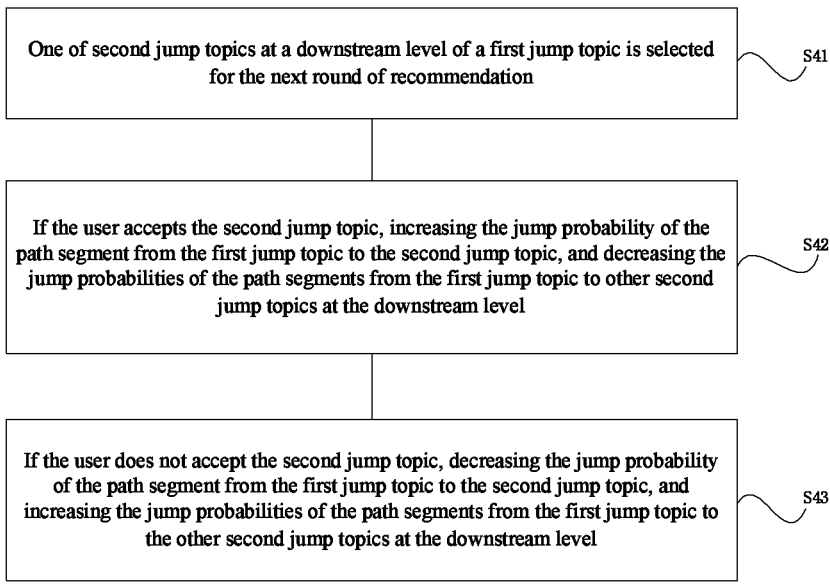
FIG. 4 is a flowchart of still another embodiment of the human-machine dialogue method according to the present invention.

As shown in FIG. 4, in some embodiments, the sum of the initial jump probabilities of the k path segments from each jump topic to the k jump topics at the downstream level is 1. The process of changing topics further includes the following steps.

In step S41, one of second jump topics at a downstream level of a first jump topic is selected for the next round of recommendation.

In step S42, if the user accepts the second jump topic, the jump probability of the path segment from the first jump topic to the second jump topic is increased, and the jump probabilities of the path segments from the first jump topic to other second jump topics at the downstream level are decreased to maintain the sum of the jump probabilities of the path segments from the first jump topic to all the second jump topics at the downstream level to be 1.

In step S43, if the user does not accept the second jump topic, the jump probability of the path segment from the first jump topic to the second jump topic is decreased, and the jump probabilities of the path segments from the first jump topic to the other second jump topics at the downstream level are increased to maintain the sum of the jump probabilities of the path segments from the first jump topic to all the second jump topics at the downstream level to be 1, and another second jump topic at the downstream level of the first jump topic is selected for the next round of recommendation.

In the embodiment of the present invention, the probability of jumping to the recommended jump topic is correspondingly modified according to the user's reaction to each jump topic recommended thereto, so that the topic jump map can be optimized in time in order to provide a more friendly dialogue for the subsequent human-machine dialogue service.

In addition, after the adjustment of the jump probability, the calculation amount of the computer can be reduced when the human-machine dialogue is conducted again in the subsequent period. For example, an enterprise business card dialogue robot that wants to spread key information about an enterprise and adopts an optimized topic jump map which can make every jump topic recommended to the user by the computer is a topic of interest to the user (the situation that the computer recommends topics that the user does not like and the computer needs to recalculate and recommend new topics to the user does not exist or is at least reduced), so that the computer can save a lot of workload of recalculation and repeated recommendation, ensuring efficient use of the computer's processing power. For example, in the case that the computer originally needs to calculate 10 steps of jump to achieve the purpose of spreading the key information of the enterprise, the computer can be optimized so that only a calculation of 5 steps of jump is necessary to achieve the purpose of spreading the key information of the enterprise, thus decreasing the calculation amount of the computer and improving the efficiency of reaching the target topic.

In some embodiments, the method also includes:

when the cumulative number of change selections exceeds a predetermined number of times, reselecting a topic independent of the first jump topic.

In this embodiment of the present invention, the predetermined number of times may be 3-5, which limits the number of times of recommending jump topics to the user to a predetermined number, so as to avoid harassment caused to the user by too many topics that are not acceptable to the user, and the jump for jumping to the jump topic rejected by the user is configured with a jump probability less than the initial jump probability, so that when it is applied to optimization, the probability that the jump topic once rejected by the user is recommended again is reduced to avoid causing trouble to the user again, thereby enhancing the friendliness of human-machine dialogue and further enhancing user experience.

In some embodiments, in the dynamic adjustment of the topic jump map, several jump topics are automatically selected for each topic according to different strategies and the jump probability is set. But these jumps may not be accepted by the user. Therefore, in actual use, these jump paths and jump probabilities need to be continuously adjusted according to the user's usage.

Online learning of jump probability is described hereinbelow.

In some embodiments, if a user accepts the jump recommendation (or clicks the machine's jump recommendation to be affirmative), the jump path m obtains a positive reward, the jump probability on the path is increased accordingly by $x_1$ ($P_m=P_m+x_1$). $P_m$ is the jump probability of this path, and the jump probabilities of jumping from this topic to other path segments at the downstream level are reduced by $x_1/(N-1)$, that is, $P_n=P_n-x_1/(N-1)$, to ensure that the sum of all the probabilities of all jump paths of a topic is always 1. N is the number of jump paths (that is, the number of jump topics at the current downstream level), n=1, . . . , N-1, and n≠m. $x_1$ is a preset value between 0 and 1, which is usually a small positive number, such as $x_1$=0.001. If the user explicitly rejects the jump suggestion, the jump path m obtains a negative reward, and the jump probability on the path is decreased accordingly by $y_1$ ($P_m=P_m-y_1$), and the jump probabilities of other paths that jump out of this topic are respectively increased by $y_1/(N-1)$, that is, $P_n=P_n+y_1/(N-1)$, N is the number of jump paths, n=1, . . . , N, and n is not equal to m, and $y_1$ is a preset value between 0 and 1, which is usually a small positive number, such as y1=0.0015. Similarly, if the user does not click on the recommended topic, the jump probability of the jump path is decreased by $y_2$, the jump probabilities of other paths is increased by $y_2/(N-1)$, in which $y_2$ is usually a small positive number, such as $y_2$=0.0005. The settings of $x_1$, $y_1$, $y_2$ can also be adjusted dynamically according to the amount of usage of jump topic. The more times it is used, the smaller these values should be. Described here is a method for adjusting the jump probability in real time according to each use situation. In practical applications, it can also be changed to an algorithm for timing adjustment based on hourly and daily usage.

Optimization of the jump path: When the probability of a jump path is less than a preset threshold, the path is cancelled. At the same time, a new path is selected from the paths that have not been tried, and is assigned an initial jump probability $z_1$ (the probabilities of other paths need to be adjusted to ensure that the sum of the probabilities on all paths is 1).

In some embodiments, after multiple human-machine dialogues, if there is at least one path segment the jump probability of which is below a predetermined threshold, the at least one path segment in the topic jump map is disconnected, and the topic jump map is updated for the next human-machine dialogue.

In the embodiment of the present invention, the optimization of the topic jump map is realized during the human-machine dialogue. If the jump probability value of the path segment from a certain jump topic to another jump topic is less than a predetermined threshold (at least one such path segment exists), this certain jump topic is directly deleted, so as to avoid low-probability jump paths interfering with future human-machine dialogues. On the other hand, it can also achieve the effect of simplifying the topic jump map and speeding up the real-time nature of human-machine dialogues (because, when the entire topic jump map is large enough, the number of actually existing jump topics and the path segments therebetween are very large, then the small probability path segments are disconnected, which, to a large extent, simplifies the structure of the topic jump map, and correspondingly greatly improves the real-time nature of the human-computer dialogue process based on the topic jump map).

In some embodiments, when disconnecting the at least one path segment in the topic jump map, a new jump topic is configured for the jump topic at an endpoint of the at least one path segment. In the embodiment of the present invention, in the process of constructing the topic jump map, a plurality of jump topics selected for each current topic that can jump to is selected from all topics related to the current topic. The unselected associated topics are stored as a set of candidate jump topics for the corresponding current topic. In this embodiment, a new jump topic configured for the jump topic at an endpoint of the at least one path segment is selected from a set of candidate jump topics for the topic at another endpoint of the path segment.

When all the determined topics related to the current topic are all set as jump topics of the current topic, in this embodiment, a new jump topic configured for the jump topic at an endpoint of the at least one path segment may be a jump topic randomly selected from the topic jump map and assigned a jump probability.

In the embodiment of the present invention, while deleting downstream jump topics in at least one path segment the jump probability of which is lower than a predetermined threshold, a new jump topic is also brought in, which ensures that the originally unreasonable jump map is optimized (jump topics frequently rejected by users are deleted), and ensures the diversity of recommended jump topics for users (which ensures that the number of target jump topics that the current jump topic can jump to is not excessively few), as well as make it possible to retrieve the jump nodes that were wrongly determined when the jump map was initially constructed to form a more reasonable and efficient jump map.

In some embodiments, the method further includes categorizing users according to user attributes to generate corresponding topic jump maps according to user categories.

In this embodiment, by conducting categorizing according to user attributes, a jump map of a corresponding category is generated for users of different categories, so that when a user uses the jump map robot in the embodiment of the present invention to conduct a dialogue, he/she can obtain a robot working mode that is more suitable for him/her, thus the human-machine dialogue process is smoother and the user experience is improved.

In the process of implementing the present invention, the inventors found that when the identities of the users are different, the topics of interest are different. For example, for a sales assistant robot, it needs to provide users with an introduction to various related company information. However, when a consulting user is a purchaser, his/her concerns may be more concentrated on the cost-effectiveness of the product, so the jump map constructed and optimized for this group of people must be the topic of the cost-effectiveness of the product. When a consulting user is a technical R & D personnel, he/she may pay more attention to the introduction of topics such as product performance and principles, thus the jump map constructed for such people should focus on the topic of product performance and principles.

In the embodiment of the present invention, the user attributes may include user's job title, user gender, user age, etc., and may be obtained by asking the user to fill in these information before the user starts consulting, or by any other method, which is not limited in the present invention.

In the embodiment of the present invention, the initial state of the dialogue is determined according to user behavior. If the user directly asks a question, the question is semantically interpreted, from which relevant knowledge points are found, and an accurate answer is given.

Then, the topic to which the knowledge point belongs and a list of subsequent topics that the topic can jump to and the jump probabilities thereof are obtained. Sampling is conducted according to the jump probabilities, and the target jump topic (selected jump topic) of this dialogue is selected.

In the embodiment of the present invention, there are two ways to guide the jump of topics:

Topic recommendation mode: one or more target jump topics are directly recommended to the user, and the user selects them by clicking (this mode is only applicable to the situation where there is a screen and interrupts the dialogue flow, which may make the user feel uncomfortable). Or, A question is generated by the robot to a user according to the content of the target jump topic, and whether to jump is determined according to the user's answer (no screen required). For example, the user is asked "Do you want to know about other products?" or "Do you want to know about ** products?). If the user's answer is yes, the dialogue jumps to the target jump topic. If the user denies, then the target jump topic is reselected.

A robot adopting the robot dialogue method according to the present invention has a clear dialogue intention (i.e., target topic). Through a series of pre-customized topics and planning for topic jump, the robot will ask the user according to the topic of the current chat and guide the user to proceed to the next topic. In this way, the robot can inspire the user to know about more related topics through continuous questioning and guidance, and finally reach the predetermined communication intention (i.e., reaching the target topic). The present invention can help the business personnel of an enterprise to construct various service robots with clear intentions, such as sales assistant, marketing assistant, recruitment assistant, tour guide assistant, and so on.

For example, a skillful salesperson will prepare a series of topics (company introduction, product introduction, case introduction, plan and quotation) in advance. No matter what topic a customer begin to talk about, it is desirable to introduce all these information and finally lead to the discussion of the plan and quotation. The present invention is to give robots such capabilities.

Most of the existing dialogue technologies focus on the understanding of user intentions, and use various algorithms (rule matching, SVM classification, deep neural network, etc.) to solve the diversity of user intention expression problem (the same intention may have various expressions) and intent disambiguation problem (one sentence may mean multiple intentions), and find the correct answer or perform the correct operation according to the user's intention. Existing dialogue management systems also mainly track user intentions and plan dialogue processes based on judgments or guesses about user intentions. Such technology is developed in a human-oriented manner (user intentions), and can be carried out smoothly in a human-centric scenario, such as smart speakers, smart car systems, and smart TVs, etc. However, the inventors found that such passive response robots often cannot meet the demand when these technologies are directly applied to enterprise service scenes and education scenes which require definite communication intentions. In many application scenarios, robots need to have clear communication goals and can guide the user to interact to achieve the desired goals.

Embodiments of the present invention can be used to provide tools to help industry experts (sales experts, education experts, medical experts, etc.) build robots with clear communication goals, and assist experts in business training or preliminary communication with customers, thereby greatly saving the time and effort of these experts to achieve cost savings and improve efficiency.

It should be noted that the foregoing method embodiments are described as a series of actions for the sake of simple description, but those skilled in the art would know that the present invention is not limited by the sequence of actions described. Because according to the present invention, certain steps can be performed in other orders or simultaneously. Secondly, those skilled in the art would also know that the embodiments described in the specification are all preferred embodiments, and the involved actions are not necessarily required by the present invention. In the above embodiments, the description of each embodiment has its own emphasis. For a part that is not detailed in an embodiment, reference can be made to the related descriptions of other embodiments.

In some embodiments of the present invention, there is provided a non-volatile computer-readable storage medium in which one or more programs including execution instructions are stored, and the execution instructions can be read and executed by an electronic device (including but not limited to computers, servers, or network devices, etc.) to perform any one of the above human-computer dialogue methods of the present invention.

In some embodiments of the present invention, there is further provided a computer program product including a computer program stored in a non-volatile computer-readable storage medium, and the computer program includes program instructions which, when being executed by a computer, cause the computer to perform any one of the above-mentioned human-computer dialogue methods.

In some embodiments of the present invention, there is further provided an electronic device including at least one processor and a memory communicatively connected to the at least one processor. The memory stores instructions executed by the at least one processor to cause the at least one processor to perform a human-machine dialogue method.

In some embodiments of the present invention, there is further provided a storage medium in which a computer program is stored. The program is executed by a processor to perform a human-machine dialogue method as discussed above.

Figure 5:
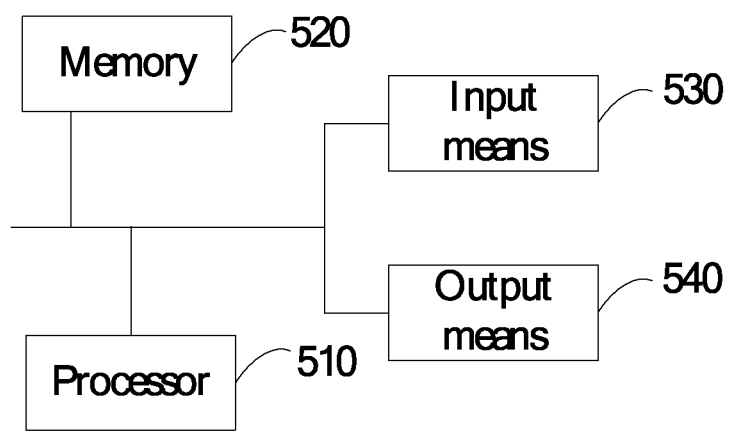
FIG. 5 is a schematic structural diagram of an embodiment of an electronic device according to the present invention.

FIG. 5 is a schematic diagram of a hardware structure of an electronic device for performing a human-machine dialogue method according to another embodiment of the present application. As shown in FIG. 5, the device includes one or more processors 510 and a memory 520, taking one processor 510 as an example Fig.

The device for performing a human-machine dialogue method may further include an input means 530 and an output means 540.

The processor 510, the memory 520, the input means 530, and the output means 540 may be connected through a bus or in other ways. In FIG. 5, connection through a bus is used as an example.

The memory 520 is a non-volatile computer-readable storage medium, and can be used to store non-volatile software programs, non-volatile computer executable programs, and modules, such as program instructions/modules corresponding to the human-machine dialogue method in the embodiments of the present application. The processor 510 performs various functional applications and data processing of a server by running the non-volatile software programs, instructions, and modules stored in the memory 520, that is, implementing the human-machine dialogue method in the foregoing method embodiment.

The memory 520 may include a storage program area and a storage data area. The storage program area may store an operating system and application programs required by at least one function. The storage data area may store data generated according to the use of a human-machine dialogue device and the like. In addition, the memory 520 may include a high-speed random access memory, and may also include a non-volatile memory, such as at least one magnetic disk storage device, a flash memory device, or other non-volatile solid-state storage devices. In some embodiments, the memory 520 may optionally include memories remotely disposed with respect to the processor 510, and these remote memories may be connected to the human-machine dialogue device through a network. Examples of the above network include but are not limited to the Internet, intranet, local area network, mobile communication network, and combinations thereof.

The input means 530 can receive input digital or character information, and generate signals related to user settings and function control of the human-machine dialogue device. The output means 540 may include a display device such as a display screen.

The one or more modules are stored in the memory 520, and when executed by the one or more processors 510, perform the human-machine dialogue method in any of the above method embodiments.

The above-mentioned products can perform the method according to the embodiments of the present application, and have corresponding function modules and beneficial effects for performing the method. For technical details that are not described in detail in this embodiment, reference may be made to the method provided in the embodiments of the present application.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices;

(4) Server providing computing services and including a processor, hard disk, memory, system bus, etc., with a similar architecture to a general-purpose computer but a higher processing power and stability, reliability, security, scalability, manageability and for providing highly reliable services; and (5) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A human-machine dialogue method applicable to an electronic device, the method comprising:

determining a set number of jump topics around a target topic, and generating a topic jump map converging to the target topic based on correlation among the set number of jump topics, wherein k path segments from each jump topic to k jump topics at a downstream level are configured respectively with an initial jump probability;

selecting from the topic jump map a jump topic to which a user's dialogue request belongs as an initial topic for a first round of recommendation to the user after an initial response to a user's dialogue request;

determining a jump topic for jumping to according to the jump probability of jumping out of the initial topic to the k jump topics at the downstream level for a next round of recommendation to the user after completing a human-machine dialogue of the initial topic; and gradually guiding the dialogue from the initial topic to the target topic in a step-by-step recommendation manner, after jumping to the target topic through the step-by-step recommendation manner and completing the human-machine dialogue, determining a jump path from the initial topic to the target topic; and increasing the jump probability of each path segment on the jump path, and updating the topic jump map for a next human-machine dialogue;

wherein a sum of the initial jump probabilities of the k path segments from each jump topic to the k jump topics at the downstream level is 1; and wherein a process of recommending jump topics further comprises:

when one of second jump topics at a downstream level of a first jump topic is selected for a next round of recommendation, upon the user not accepting the second jump topic, decreasing the jump probability of the path segment from the first jump topic to the second jump topic, and increasing the jump probabilities of the path segments from the first jump topic to the other second jump topics at the downstream level, to maintain the sum of the jump probabilities of the path segments from the first jump topic to all the second jump topics at the downstream level to be 1, and select another second jump topic at the downstream level of the first jump topic for the next round of recommendation; and when the user does not accept the second jump topics multiple number of times, reselecting a topic independent of the first jump topic.

2. The method according to claim 1, further comprising:
while increasing the jump probability of the path segment P (i, i+1) from the i-th jump topic on the jump path to the (i+1)-th jump topic at the downstream level, decreasing accordingly the jump probabilities of k−1 path segments of k−1 jump topics at the downstream level other than the (i+1)-th jump topic from the i-th jump topic to maintain the sum of the jump probabilities of the k path segments at the downstream level from the i-th jump topic to be 1.

3. The method according to claim 2, wherein after multiple human-machine dialogues, if the jump probability of at least one path segment is decreased below a predetermined threshold, the at least one path segment in the topic jump map is disconnected, and the topic jump map is updated for use in the next human-machine dialogue.

4. The method according to claim 3, wherein when the at least one path segment in the topic jump map is disconnected, a new jump topic is configured for an endpoint of the at least one path segment.

5. The method according to claim 1, further comprising classifying users according to user attributes to generate corresponding topic jump maps according to user categories.

6. An electronic device, comprising at least one processor and a memory communicatively connected to the at least one processor, wherein the memory stores instructions executable by the at least one processor, wherein execution of the instructions by the at least one processor causes the at least one processor to perform the steps of:

determining a set number of jump topics around a target topic, and generating a topic jump map converging to the target topic based on correlation among the set number of jump topics, wherein k path segments from each jump topic to k jump topics at a downstream level are configured respectively with an initial jump probability;

selecting from the topic jump map a jump topic to which a user's dialogue request belongs as an initial topic for a first round of recommendation to the user after an initial response to a user's dialogue request;

determining a jump topic for jumping to according to the jump probability of jumping out of the initial topic to the k jump topics at the downstream level for a next round of recommendation to the user after completing a human-machine dialogue of the initial topic; and gradually guiding the dialogue from the initial topic to the target topic in a step-by-step recommendation manner, after jumping to the target topic through the step-by-step recommendation manner and completing the human-machine dialogue, determining a jump path from the initial topic to the target topic; and increasing the jump probability of each path segment on the jump path, and updating topic jump map for a next human-machine dialogue;

wherein a sum of the initial jump probabilities of the k path segments from each jump topic to the k jump topics at the downstream level is 1; and wherein a process of recommending jump topics further comprises:

when one of second jump topics at a downstream level of a first jump topic is selected for a next round of recommendation, if the user accepts the second jump topic, increasing the jump probability of the path segment from the first jump topic to the second jump topic, and decreasing the jump probabilities of the path segments from the first jump topic to other second jump topics at the downstream level, to maintain the sum of the jump probabilities of the path segments from the first jump topic to all the second jump topics at the downstream level to be 1;

if the user does not accept the second jump topic, decreasing the jump probability of the path segment from the first jump topic to the second jump topic, and increasing the jump probabilities of the path segments from the first jump topic to the other second jump topics at the downstream level, to maintain the sum of the jump probabilities of the path segments from the first jump topic to all the second jump topics at the downstream level to be 1, and select another second jump topic at the downstream level of the first jump topic for the next round of recommendation; and when the user does not accept the second jump topics multiple number of times, reselecting a topic independent of the first jump topic.

7. The method according to claim 1, wherein after multiple human-machine dialogues, if the jump probability of at least one path segment is decreased below a predetermined threshold, the at least one path segment in the topic jump map is disconnected, and the topic jump map is updated for use in the next human-machine dialogue.

8. The method according to claim 7, wherein when the at least one path segment in the topic jump map is disconnected, a new jump topic is configured for an endpoint of the at least one path segment.

9. The electronic device according to claim 6, further comprising:

while increasing the jump probability of the path segment P (i, i+1) from the i-th jump topic on the jump path to the (i+1)-th jump topic at the downstream level, decreasing accordingly the jump probabilities of k−1 path segments of k−1 jump topics at the downstream level other than the (i+1)-th jump topic from the i-th jump topic to maintain the sum of the jump probabilities of the k path segments at the downstream level from the i-th jump topic to be 1.

10. The electronic device according to claim 9, wherein after multiple human-machine dialogues, if the jump probability of at least one path segment is decreased below a predetermined threshold, the at least one path segment in the topic jump map is disconnected, and the topic jump map is updated for use in the next human-machine dialogue.

11. The electronic device according to claim 10, wherein when the at least one path segment in the topic jump map is disconnected, a new jump topic is configured for an endpoint of the at least one path segment.

12. The electronic device according to claim 6, wherein execution of the instructions by the at least one processor causes the at least one processor to perform the steps of: classifying users according to user attributes to generate corresponding topic jump maps according to user categories.

* * * * *